United States Patent [19]

Hayashi et al.

[11] Patent Number: 4,903,156
[45] Date of Patent: Feb. 20, 1990

[54] MAGNETIC RECORDING AND/OR REPRODUCING APPARATUS HAVING A HEAD SUPPORT MECHANISM FOR SUPPRESSING VIBRATION OF MAGNETIC HEADS

[75] Inventors: Tohru Hayashi, Mitaka; Yoshiaki Sakai, Higashikurume; Shinichi Aikawa, Mitaka; Hiroshi Matsunaga, Kunitachi; Jun Makabe, Higashimurayama, all of Japan

[73] Assignee: TEAC Corporation, Japan

[21] Appl. No.: 193,516

[22] Filed: May 12, 1988

[30] Foreign Application Priority Data

May 21, 1987 [JP] Japan .................................. 62-122630

[51] Int. Cl.[4] .......................... G11B 5/58; G11B 21/20
[52] U.S. Cl. ..................................... 360/104; 360/105
[58] Field of Search ................................. 360/104, 105

[56] References Cited

U.S. PATENT DOCUMENTS 4,791,501 12/1988 Kumakura et al. .................. 360/104

Primary Examiner—Robert S. Tupper
Attorney, Agent, or Firm—Andrus, Sceales, Starke & Sawall

[57] ABSTRACT

A magnetic recording and/or reproducing apparatus comprises a first magnetic head mounted on a carriage and a second magnetic head mounted on an arm which swings to and from the carriage, for engagement with a first and second side respectively of a flexible magnetic disc. The first and second magnetic heads are mounted on the carriage and the arm respectively via first and second gimbal plates. The elastic modules of the first gimbal plate is chosen such that the resonance of the first and second magnetic heads due to external vibration is avoided.

3 Claims, 7 Drawing Sheets

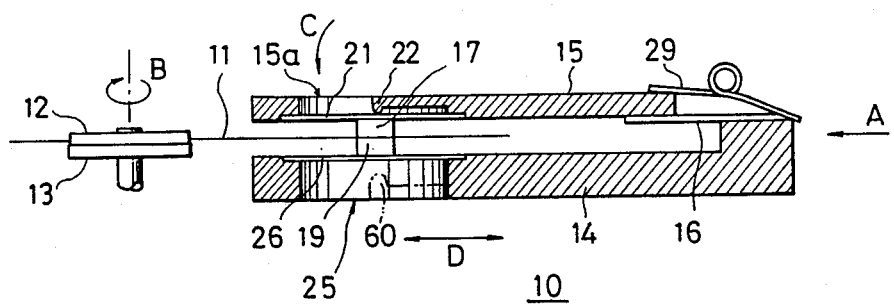
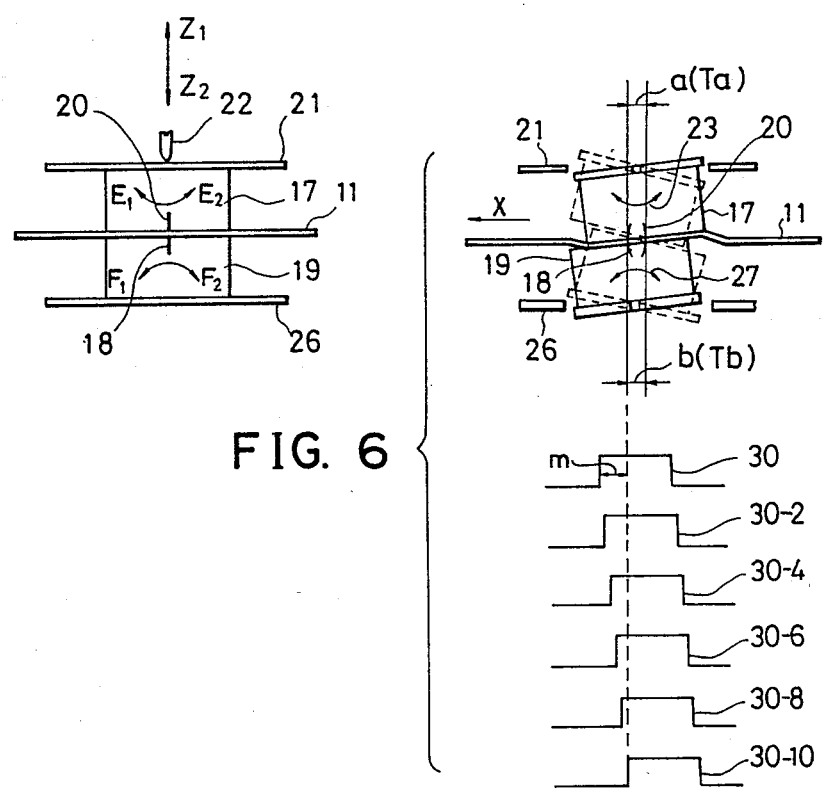

MAGNETIC RECORDING AND/OR REPRODUCING APPARATUS HAVING A HEAD SUPPORT MECHANISM FOR SUPPRESSING VIBRATION OF MAGNETIC HEADS

BACKGROUND OF THE INVENTION

The present invention generally relates to magnetic recording and/or reproducing apparatus and in particular to a magnetic recording and/or reproducing apparatus for recording and/or reproducing information signals on and/or from both sides of a flexible rotary magnetic recording medium.

There is a magnetic recording and/or reproducing apparatus for recording and/or reproducing an information signal on and/or from both sides of a flexible rotary magnetic recording medium such as a floppy disk by means of a lower magnetic head mounted on a carriage and an upper magnetic head mounted on an arm which swings to and from the carriage.

In such a magnetic recording and/or reproducing apparatus, it is essential to maintain the upper magnetic head and the lower magnetic head which scan respective sides of the magnetic disk in parallel for a correct recording and/or reproducing operation. If such parallelism is lost, the magnetic heads lose the close engagement with the surface of the magnetic disk and the signal level for the recording and/or reproducing is decreased. This leads to an erroneous recording and/or reproduction of the information signal. As the upper magnetic head mounted on the arm moves with the swinging motion of the arm, it is difficult to maintain the upper magnetic head in parallel to the lower magnetic head as long as it is mounted directly on the arm. Because of this, the upper magnetic head is usually mounted on the arm via a gimbal supporting mechanism. The gimbal supporting mechanism is formed by a thin metallic plate, and maintains the upper magnetic head mounted thereon parallel to the lower magnetic head by supporting the head in a manner such that the head swings freely around two axes which cross perpendicularly to each other. Further, the arm is urged by a spring so that the upper magnetic head on the arm is pressed against the magnetic disk with a predetermined force.

However, in such a magnetic recording and/or reproducing apparatus, there is a tendency that a dropout of recorded or reproduced signal arises due to a leaping motion of the upper magnetic head when a strong vibration is applied to the apparatus. Such a vibration is transmitted from the apparatus to the lower magnetic head which is directly mounted on the apparatus, which in turn transmits the vibration to the upper magnetic head.

Another magnetic recording and/or reproducing apparatus having a similar gimbal supporting mechanism for the lower magnetic head is also proposed for improving the parallelism between the upper magnetic head and the lower magnetic head. In such an apparatus, however, there arises a problem of resonance between the gimbal supporting mechanism carrying the lower magnetic head and the gimbal supporting mechanism carrying the upper magnetic head.

Recent magnetic recording and/or reproducing apparatuses are required to perform a high density recording of information. As the recording density increases, the occurrence of the dropout of the information signal increases. Such dropout of the information signal is often caused by a vibration of the apparatus and such vibration is caused by a source such as a motor in the apparatus. Thus, the vibration proof performance required for the magnetic recording and/or reproducing apparatus becomes more severe with increased recording density.

In the magnetic recording and/or reproducing apparatus of the type aforementioned, a particularly careful design is required for the vibration proof performance, as such an apparatus involves the problem of resonance between the gimbal supporting mechanisms for the upper magnetic head and the lower magnetic head.

SUMMARY OF THE INVENTION

Accordingly, it is a general object of the present invention to provide a novel and useful magnetic recording and/or reproducing apparatus wherein the aforementioned problems are eliminated.

Another and more specific object of the present invention is to provide a magnetic recording and/or reproducing apparatus for recording and/or reproducing an information signal on and/or from both sides of a flexible rotary magnetic recording medium comprising a first magnetic head mounted on a carriage via a first gimbal supporting mechanism, and a second magnetic head mounted on an arm which is pivoted on the carriage for a swinging motion to and from the magnetic recording medium, via a second gimbal supporting mechanism, wherein the resonance of the first and second magnetic head is avoided by appropriately selecting the elastic modulus of the first gimbal supporting mechanism.

Another object of the present invention is to provide a magnetic recording and/or reproducing apparatus for recording and/or reproducing an information signal on and/or from both sides of a flexible rotary magnetic recording medium comprising first magnetic head means for recording and/or reproducing the information signal on and/or from a first side of the magnetic recording medium, said first magnetic head means for engagement with the first side of the magnetic recording medium being mounted on a first biaxial gimbal supporting means fixed on a carriage such that said first magnetic head means swings freely around two mutually perpendicular axes which extend parallel to the magnetic recording medium, a second magnetic head means for recording and/or reproducing the information signal on and/or from a second side of the magnetic recording medium, said second magnetic head means for engagement with the second side of the magnetic recording medium being mounted on a second biaxial gimbal supporting means fixed on an arm which in turn is pivoted on the carriage so that the arm swings to and from the carriage such that said second magnetic head means swings freely around two mutually perpendicular axes which extend parallel to the magnetic recording medium, said first biaxial gimbal supporting means being elastically deflected in a direction perpendicular to the two axes of the gimbal supporting action of the first gimbal supporting means so that the first magnetic head means follows the displacement of the magnetic recording medium in a direction perpendicular to the surface of the magnetic recording medium, wherein the elastic modulus of the first gimbal supporting means for the motion of the first magnetic head means in the direction perpendicular to the surface of the magnetic recording medium and the elastic modulus of the first gimbal supporting means for the swinging motion of the first magnetic head means around the two mutually perpendicular axes are chosen such that the resonance between the first magnetic head means and the second magnetic head means is avoided. According to the present invention, the resonance of the magnetic heads in the magnetic recording and/or reproducing apparatus is avoided by an optimization of the elastic moduli of the biaxial gimbal supporting means alone. Thus, the vibration resistant performance of the magnetic recording and/or reproducing apparatus is easily improved.

Other objects and further features of the present invention will become apparent from the following detailed description when read in conjunction with the attached drawings.

BRIEF DESCRIPTION OF THE DRAWINGS

FIG. 1 is a cross sectional view showing an arrangement of the magnetic recording and/or reproducing apparatus according to the present invention;

FIG. 3 is a side view of a magnetic head in FIG. 1 from a direction as indicated by an arrow A;

FIG. 6 is a diagram showing a relatively small swinging motion of the magnetic head in the apparatus of FIG. 1 and various timings of the window interval for quantitative measurement of the vibration resistant performance of the magnetic recording and/or reproducing apparatus;

DETAILED DESCRIPTION

Figure 2:
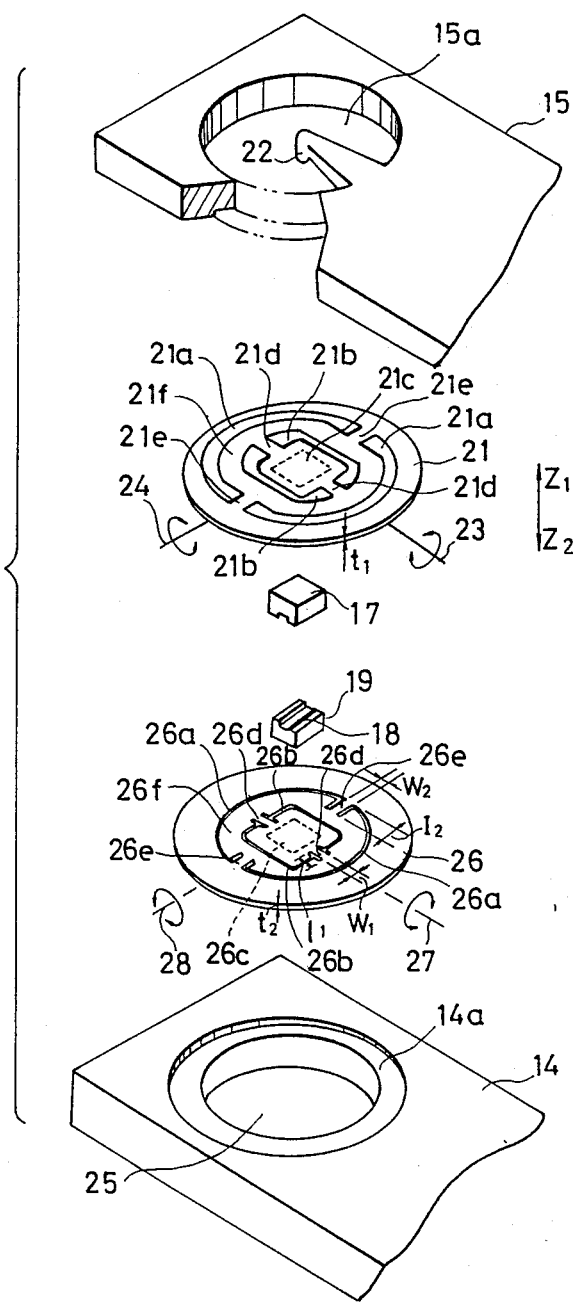
FIG. 2 is an exploded oblique view showing the major part of the apparatus shown in FIG. 1.

FIG. 1 is a cross sectional view showing the magnetic recording and/or reproducing apparatus 10 (referred to hereinafter as apparatus) according to the present invention. In the drawing, a flexible magnetic disk 11 which is an example of the flexible rotary magnetic recording medium is mounted on the apparatus 10 by holding a central hub 12 of the disk being fixed on a turntable 13. The magnetic disk 11 is rotated as indicated by an arrow B.

The apparatus 10 further includes a carriage 14 which is moved along the surface of the magnetic disk 11 and the carriage 14 carries a leaf spring 16 on which is mounted an arm 15 which swings as indicated by an arrow C. The carriage is formed with an aperture 25 and a generally circular first gimbal plate 26 which is an example of the first gimbal supporting means is disposed in the aperture 25 so as to close the aperture. This first gimbal plate 26 carries a first magnetic head 19 which engages with a first side of the magnetic disk 11. An aperture 15a is formed in the arm 15 and a generally circular second gimbal plate 21 which is an example of the second gimbal supporting means is mounted in the aperture 15a. This second gimbal plate 21 carries a second magnetic head 17 which engages with a second side of the magnetic disk 11.

A central portion of the gimbal plate 21 is supported by a pivot 22 which is formed as a part of the arm 15, and the pivot 22 and the arm 15 are urged by a spring 29 in the direction indicated by the arrow C with a force of about 20 gram. Thus, the magnetic disk 11 is rotated in a state such that it is held between the magnetic heads 17 and 19 which are respectively mounted on the carriage 14 and the arm 15 via the gimbal plate 26 and the gimbal plate 21. Further, the carriage 14 is moved in a radial direction of the magnetic disk 11 as indicated by an arrow D for recording and reproducing.

FIG. 2 is an exploded oblique view showing a major part of the apparatus shown in FIG. 1.

As can be seen in the drawing, the pivot 22 is located at a tip end of an arm extending into the generally circular aperture 15a formed in the arm 15 such that the pivot 22 locates generally at the center of the aperture 15a. This pivot 22 limits the movement of the magnetic head in a direction indicated by an arrow $Z_1$ and at the same time functions as a fulcrum supporting means for allowing the swinging motion of the magnetic head.

The gimbal plate 21 is made from a disc shaped thin metallic plate having a thickness of $t_1$ and the magnetic head 17 is mounted at a lower side of a central portion 21c of the gimbal plate 21. As illustrated, the central portion 21c is defined by a pair of generally U-shaped cutouts 21b which extend around the central portion in an inner portion 21f except for a pair of bridging portions 21d. This inner portion 21f, in turn, is defined by a pair of arcuate cutouts 21a which extend around the inner portion 21f except at a pair of bridging portions 21e. As a result, the magnetic head 17 mounted on the gimbal plate 21 swings freely around an axis 23 and around another axis 24 which extends perpendicularly thereto. In the drawing, the axis 23 extends in the radial direction of the magnetic disk 11 and the axis 24 extends in a direction of a recording track formed on the magnetic disk 11.

The carriage 14 has a circular depression 14a around the circular aperture 25 for mounting the lower gimbal plate 26 made of a circular metallic plate having a thickness $t_2$.

The gimbal plate 26 has a generally similar construction to that of the gimbal plate 21 and comprises a central portion 26c for mounting the magnetic head 19. The central portion 26c is defined by a pair of generally U-shaped cutouts 26b which extend around the central portion 26c except at a pair of bridging portions 26d having a width $W_1$ and a length $l_1$ in an inner portion 26f. This inner portion 26f, in turn, is defined by a pair of arcuate cutouts 26a which extend around the inner portion 26f except at a pair of bridging portions 26e having a width $W_2$ and a length $l_2$. As a result, the magnetic head 19 mounted on the gimbal plate 26 swings around an axis 27 and around another axis 28 which extends perpendicularly thereto. In the drawing, the axis 27 extends in the radial direction of the magnetic disk 11 and the axis 28 extends in the direction of the recording track formed on the magnetic disk 11.

With the construction described heretofore, the magnetic heads 17 and 19 can swing around the axes 23, 27 in the circumferential direction of the disk i.e. the direction of the recording track on the disk. In other words, these magnetic heads can make a pitching motion. Further, the magnetic heads 17 and 19 can swing around the axes 24 and 28 in the radial direction of the disk. In other words, the magnetic heads can make a rolling motion.

FIG. 3 is a diagram showing the magnetic heads 17 and 19 viewed from a direction as indicated by an arrow A. As can be seen in the drawing, the magnetic head 17 has a gap 20 extending in the radial direction of the disk and the magnetic head 19 has a similar gap 18. The magnetic heads 17 and 19 are held such that they can displace together in directions indicated by arrows $Z_1$ and $Z_2$ and at the same time they can individually swing in the direction indicated by arrows $E_1$, $E_2$ and $F_1$, $F_2$.

The gimbal plates 21 and 26 are made of a thin plate of beryllium-copper or stainless steel. As the thickness $t_1$ of the gimbal plate 21 is made extremely thin such as 0.05 mm, the elastic moduli of the gimbal plate 21 which produces a force acting against the swinging and pitching motion of the magnetic head 17 is extremely small. In other words, the magnetic head 17 follows the displacement of the magnetic disk 11 by freely swinging around the pivot 22 acting as the fulcrum when an external vibration is applied to the apparatus.

The thickness $t_2$ of the gimbal plate 26, the width $W_1$ and the length $l_1$ of the bridging portion 26e, and the width $W_2$ and the length $l_2$ of bridging portion 26d are chosen appropriately such that the gimbal plate 26 has a elastic modulus of 3880 g/cm in the direction perpendicular to the surface of the gimbal plate 26 and that the gimbal plate 26 has another elastic modulus of 320 g.cm/rad for the pitching motion of the magnetic head 19. In the example illustrated, the thickness $t_2$ is set to 0.17 mm–0.20 mm.

According to the construction aforementioned, the magnetic head 19 mounted on the carriage 14 via the gimbal plate 26, and the magnetic head 17 mounted, via the gimbal plate 21, on the arm 15 which is pivoted on the carriage 14 via the leaf spring 16 and is urged by the spring 29 are not only capable of following the displacement of the magnetic disk in the upward/downward direction but also capable of maintaining the engagement with the surface of the magnetic disk by performing pitching and rolling motions when a vibration is applied to the apparatus.

According to the apparatus of the present invention, the resonance of the magnetic heads 17 and 19 is suppressed by choosing the elastic moduli of the gimbal plate 26 as aforementioned by appropriately choosing the size and shape of the gimbal plate 26. For example, the mechanical system formed by the carriage, leaf spring and the arm as aforementioned has a resonant frequency at around 300 Hz. By using the gimbal plate 26 having the elastic moduli as described, one can suppress the resonance of the system at such frequency.

Next, the results of the test of the vibrational characteristic of the magnetic recording and/or reproducing apparatus having the construction as described heretofore will be described.

The test was conducted by reproducing, by means of the magnetic head, an impulse recorded on the magnetic disk and having a very short duration by shifting stepwise a predetermined interval called "window interval" during which the magnetic head is activated for detection of the impulse, under a vibration applied to the apparatus by a vibrator. Thus, the magnetic heads are activated for a predetermined interval called the window interval by a gate signal for detection of the impulse. The length of the window interval is set to 2 $\mu$sec in the illustrated example. Generally, the window interval is set to sufficiently time covering the duration of the impulse.

Figure 4:
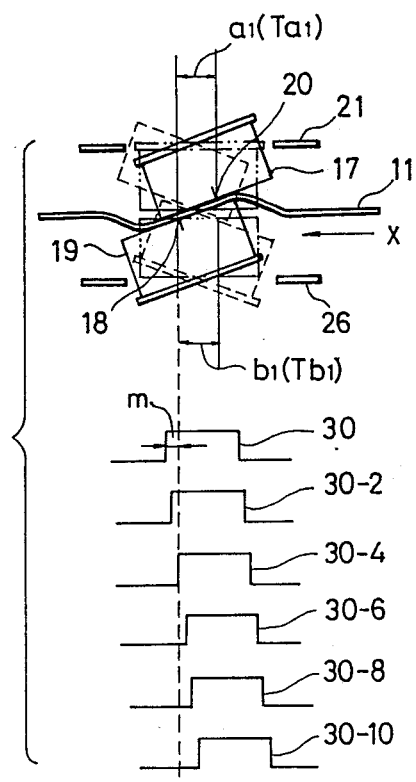
FIG. 4 is a diagram showing a relatively large swinging motion of the magnetic head in the apparatus of FIG. 1 and various timings of the window interval during which the magnetic head is activated for quantitative measurement of the vibration resistant performance of the magnetic recording and/or reproducing apparatus.
Figure 5:
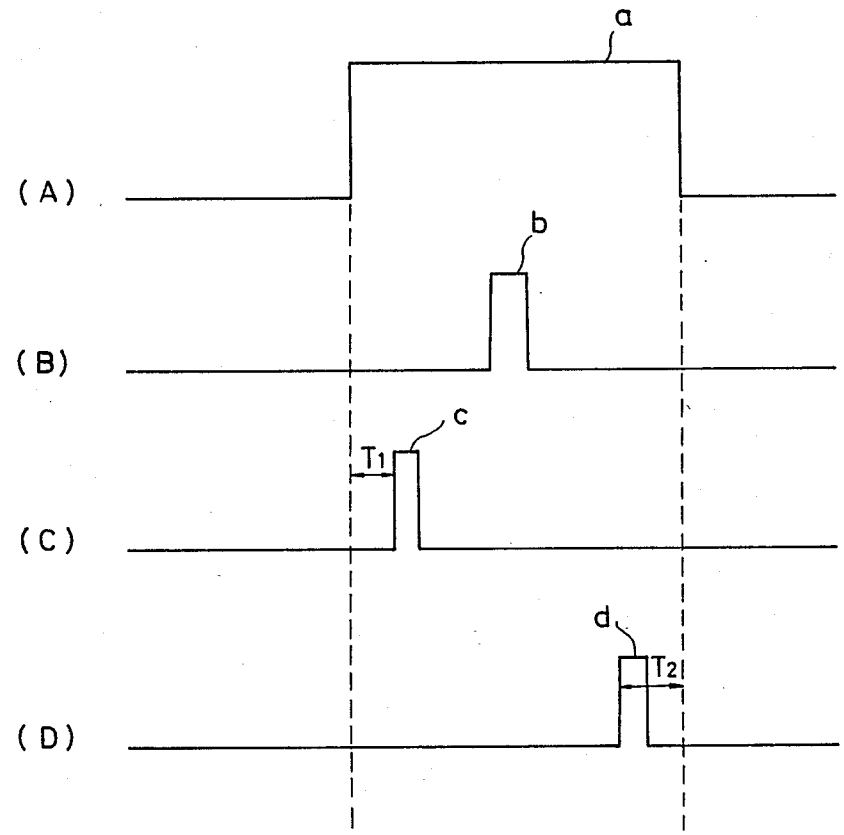
FIGS. 5(A)-(D) is a diagram showing the deviation of the reproduced pulse on the time base due to the pitching motion of the magnetic head in comparison with the pulse indicating the window interval.

FIG. 4 shows a case in which the magnetic heads 17 and 19 are swinging with a relatively large angular range responsive to the vibration from outside. The magnetic heads 17 and 19 experience both the pitching and the rolling motions as already described. In the recording and reproduction of the information signal of the magnetic disk, the pitching motion of the magnetic head is particularly critical for correct operation of the apparatus, as such a swinging motion produces a deviation of the timing of recording and/or reproducing on the time base. Because of this, only the pitching motion of the magnetic heads will be examined in the following description.

Referring to FIG. 4, the magnetic disk 11 is driven in a direction indicated by an arrow X and the magnetic heads 17 and 19 experience a pitching motion such that they swing for a distance $a_1$ and $b_1$ respectively around the axis 23 and axis 27. In the drawing, the magnetic heads swung to a first state is indicated by a solid line and the magnetic heads swung to another state is indicated by a broken line. Further, a neutral state of the magnetic heads is shown by a two-dotted line.

It should be noted that the gap 18 of the magnetic head 19 in the first state indicated by the solid line, for example, scans the magnetic disk 11 along a track on the disk with a relatively delayed timing in the time base as compared to that of the gap 18 of the magnetic head 19 which is in the other state as indicated by the broken line. In other words, the magnetic head 19 reproduces the recorded impulse on the magnetic disk with a relatively delayed timing. A similar situation also takes place in the magnetic head 17 when swung in the opposite direction. As the magnetic heads are activated only for the period of the window interval, the timing relationship between the reproduced impulse and the window interval is modified as shown in FIGS. 5(A)–(D) as will be described hereinafter.

Referring to FIGS. 5(A)–(D), the waveform a shows the window interval during which the magnetic heads are activated. The waveform b shows the timing of the reproduced pulse when the magnetic head is in the neutral state, the waveform c shows the timing of the reproduced pulse when the magnetic head is swung in one direction, and the waveform d shows the timing of the reproduced pulse when the magnetic head is swung in another direction.

As the timing of the window interval is shifted stepwise in a direction as indicated in FIG. 4 by waveforms 30, $30_{-2}$, $30_{-4}$, $30_{-6}$, $30_{-8}$ and $30_{-10}$, there appears an instant when the timing of the reproduced impulse and the timing of the window interval do not overlap anymore. In FIG. 4, the timing of the recorded impulse is indicated by a vertical broken line. At this moment, the reproduced signal is lost.

Obviously, the reproduced signal will not be lost as long as the timing of the window interval is not significantly shifted if the extent of the swinging or pitching motion of the magnetic head is small. FIG. 6 shwos such a case that the swinging motion of the magnetic head is relatively suppressed. In the examples illustrated in FIGS. 5 and 6, the timing of the window interval is shifted stepwise with a unit step set to 125 nsec. The suffix attached to the designation of the waveform in FIGS. 4 and 6 indicates the number of steps the window interval is shifted. This suffix corresponds to an amount m for the shift of the window interval on the time base as shown in FIGS. 4 and 6.

Referring to FIGS. 5(A)-(D) again, a term "window interval" is defined as a sum of a time interval T1 which corresponds to the interval between the rising edge of the pulse a and the rising edge of the pulse c and a time interval T2 which corresponds to the interval between the rising edge of the pulse d and the trailing edge of the pulse a. It should be noted that the timing of the reproduced impulse b varies between two states respectively represented by the pulse c and the pulse d. This window interval gives a measure of the vibration proof performance of the magnetic recording and/or reproducing apparatus. The window margin can be obtained by measuring the amount of the timing shift of the window pulse a from a state in which the reproduced pulse is located immediately outside of the rising edge of the window pulse to another state in which the reproduced pulse is about to cross the trailing edge of the window pulse to shift outside of the window interval by advancing or delaying the window pulse on the time base. As described previously, the shifting of the window pulse is performed stepwise with a unit step of 125 nsec. Thus, the window margin can be represented by the number of window margin steps which is the number of steps counted during this shift of the window pulse.

In FIGS. 4 and 6, the amounts of deviation on the time base corresponding to the deviations a1 and b1, or a and b are represented respectively by Ta1, Tb1, Ta and Tb.

Figure 7:
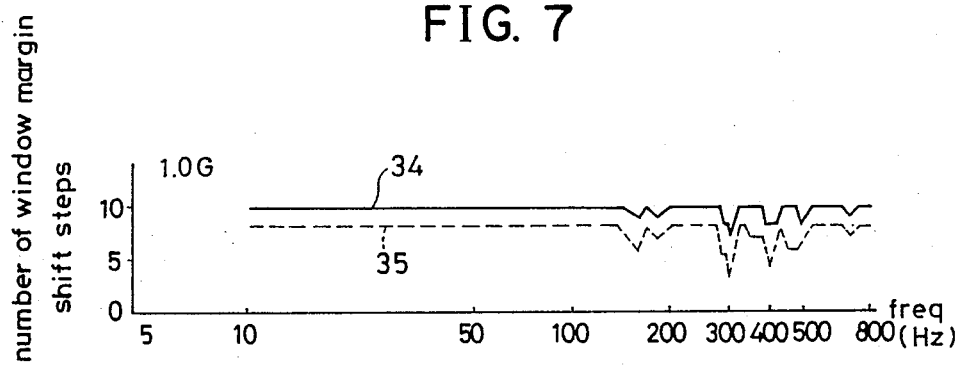
FIGS. 7 through 9 are graphs showing the vibrational characteristic of the magnetic recording and/or reproducing apparatus of FIGS. 1 and 2.
Figure 8:
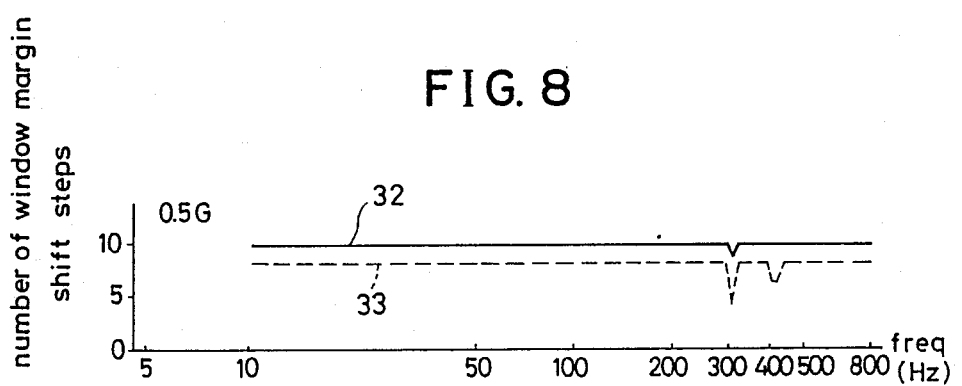
Figure 9:
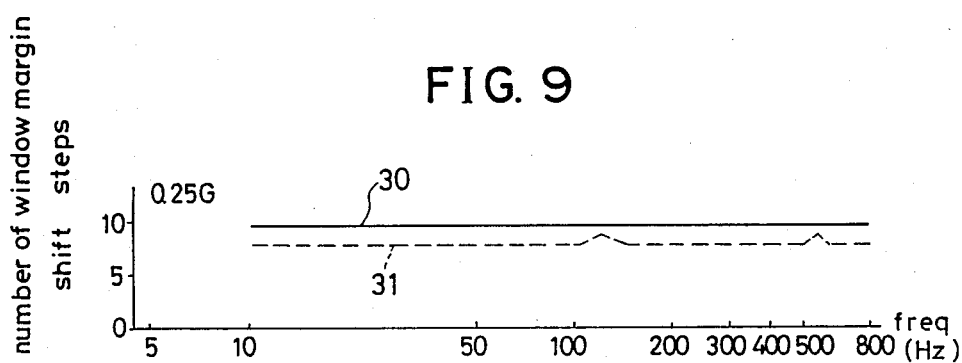

FIGS. 7 through 9 represent the result of the aforementioned test for the apparatus of the present invention for the case that the acceleration applied to the apparatus for the vibrational test is 1.0 G, 0.5 G and 0.25 G in terms of the number of the window margin shift steps corresponding to the window margin, respectively. In these graphs, the lines 30, 32 and 34 correspond to the magnetic head 17 and the lines 31, 33 and 35 correspond to the magnetic head 19. As can be seen, the graph is generally flat although the number of shift steps decreases slightly at around 300 Hz. Thus, it is clearly proved that the magnetic recording and/or reproducing apparatus of the present invention has an excellent vibration proof performance.

Figure 10:
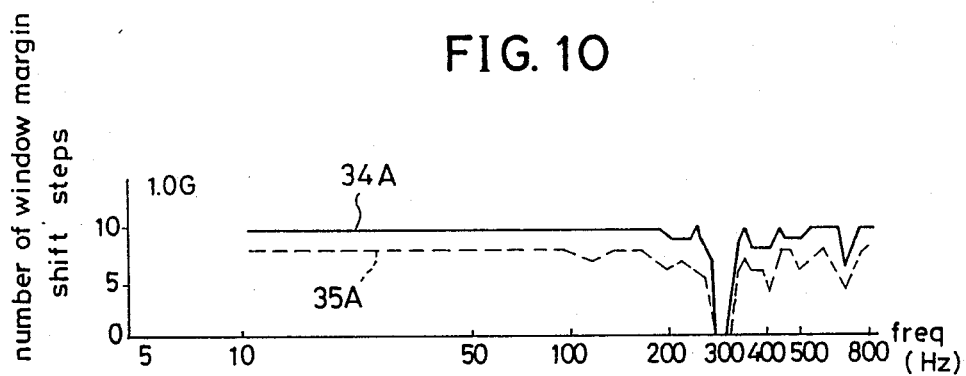
FIGS. 10 through 12 are graphs showing the vibrational characteristic of another magnetic recording and/or reproducing apparatus in comparison with the present invention.
Figure 11:
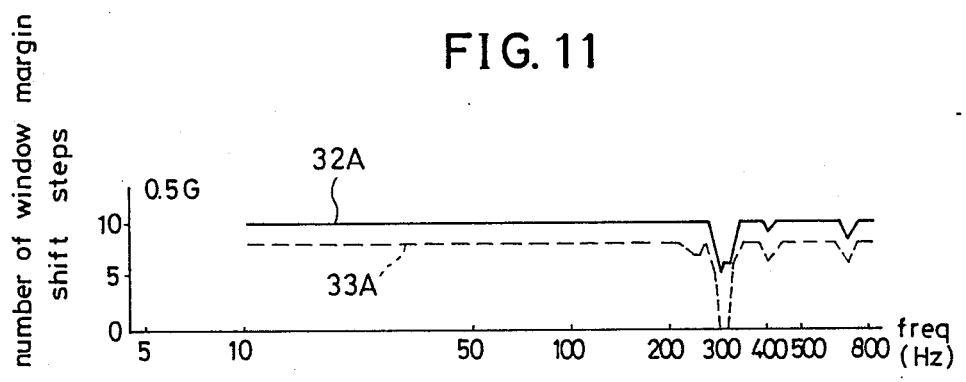
Figure 12:
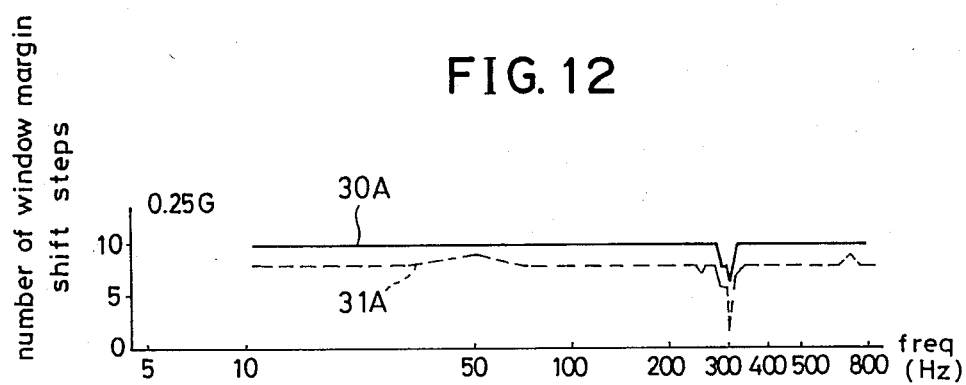

FIGS. 10 through 12 show a result of the same test for an apparatus having a generally identical construction to the apparatus of the present invention except with respect to the use of a disc-like spring plate having a substantially large elastic modulus such as 10890 g/cm (137922 g/in) as compared with the elastic modulus of the gimbal plate 26, in place of the gimbal place 26 for supporting the magnetic head 19. In FIGS. 10, 11 and 12, the acceleration of the vibration is respectively 1.0 G, 0.5 G and 0.25 G, and the lines 30A, 32A and 34A represent the number of window margin shift steps for the magnetic head 17 and the lines 31A, 33A and 35A represent the number of window margin shift steps for the magnetic head 19.

As is clear from these drawings, there exists a strong resonance at around 300 Hz. In such a frequency range, the magnetic heads 17 and 19 not only swing heavily due to the resonance but the magnetic head 17 even bounces on the surface of the magnetic disk 11 which enhances the harmful dropout of the recorded or reproduced signal.

Figure 13:
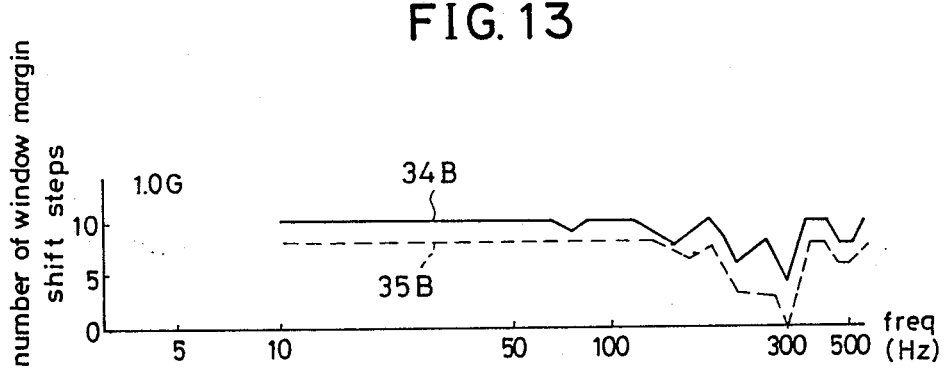
FIGS. 13 through 15 are graphs showing the vibrational characteristic of still another magnetic recording and/or reproducing apparatus in comparison with the present invention.
Figure 14:
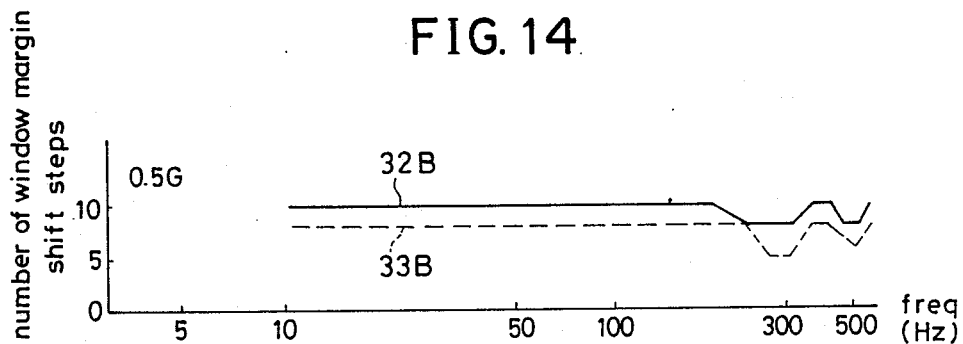
Figure 15:
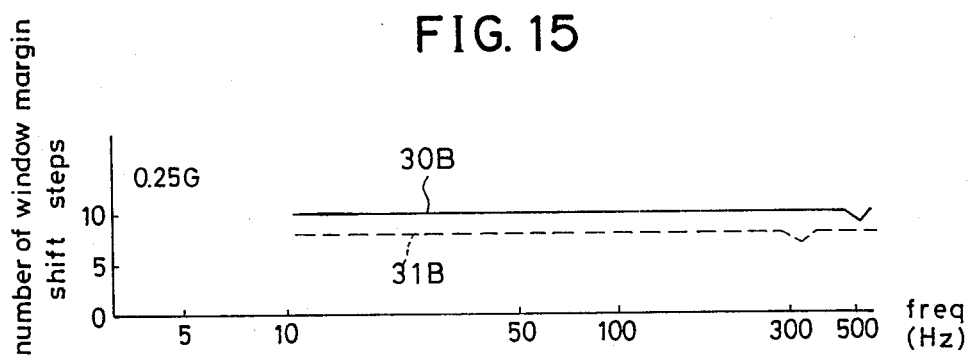

FIGS. 13 through 15 show a result of the same test for an apparatus having a generally identical construction to the apparatus of the present invention except for the use of another biaxial gimbal plate having a elastic modulus of 3810 g/cm for the direction perpendicular to the major plane of the gimbal plate and a elastic modulus of 47 g.cm/rad for the pitching motion of the magnetic head 19, in place of the biaxial gimbal plate 26. Other specifications of the test are identical to those shown in FIGS. 7 through 9. In this case, again, the existence of a significant resonance is recognized at around 300 Hz.

According to the study aforementioned, it was found that the vibrational characteristic of the magnetic recording and/or reproducing apparatus of the type specified is mainly determined by the elastic modulus of the gimbal plate 26 fixed on the carriage for carrying the magnetic head 19. Further, it was found that the elastic modulus of the gimbal plate 26 is advantageously in the range of 2000–5000 g/cm in the direction perpendicular to the major plane of the gimbal plate and also in the range of 200–500 g.cm/rad for the pitching motion of the magnetic head 19.

In the magnetic recording and/or reproducing apparatus of the present invention, one may also provide another pivot 60 as indicated by two dotted line in FIG. 1 for limiting the deflection of the gimbal plate 26.

Further, various changes and modifications may be made without departing from the scope of the present invention.

What is claimed is:

1. A magnetic recording and/or reproducing apparatus for recording and/or reproducing an information signal on both sides of a flexible rotary magnetic recording medium defined by a substantially circular periphery comprising:

carriage means disposed at one side of said flexible rotary recording medium and extending along the flexible rotary recording medium toward a radially outer direction thereof;

first biaxial gimbal support means provided on said carriage means;

first magnetic head means for engagement with the one side of the flexible rotary magnetic recording medium and carried on said first biaxial gimbal support means in a manner to swing freely around mutually perpendicular axes which extend parallel to the flexible rotary magnetic recording medium;

an arm supported on the carriage at a radially outer position of the periphery of the flexible rotary magnetic recording medium in a manner to swing close to and away from the carriage means;

resilient means for urging the arm in a direction of the carriage;

second biaxial gimbal support means provided on said arm; and second magnetic head means for engagement with another side of the flexible rotary magnetic recording medium and carried on the second biaxial gimbal support means in a manner so as to swing around mutually perpendicular axes which extend parallel to the flexible rotary magnetic recording medium, said second biaxial gimbal support means maintaining the engagement with the flexible rotary magnetic recording medium by freely swinging around a fulcrum provided by a pivot which is formed unitary with the arm, said first biaxial gimbal support means supporting the first magnetic head means with a first elastic modulus for swinging of the magnetic head means and at the same time with a second elastic modulus for a displacement vertical to the major plane of the flexible rotary magnetic recording medium, said first elastic modulus and said second elastic modulus being chosen so as to suppress the resonance of the first and second magnetic head means due to vibration applied thereto from outside;

said first biaxial gimbal support means comprising a substantially circular metal plate which carries the first magnetic head means on a mounting portion defined on an inner portion by a pair of generally U-shaped cutouts which extend around the mounting portion except at a pair of first bridging portions, said inner portion, in turn, being defined by a pair of arcuate cutouts extending around the inner portion except at a pair of second bridging portions, said first bridging portions and said second bridging portions are disposed such that a line connecting the pair of first bridging portions and another line connecting the pair of second bridging portions cross each other perpendicularly at generally the center of the first biaxial gimbal supporting means, said first and second elastic moduli are obtained by suitably choosing length and width of said first and second bridging portions and by suitably choosing thickness of the metal plate;

said second magnetic head means being urged against the flexible rotary magnetic recording medium with a force of about 20 grams, said second gimbal support means supporting the second magnetic head means such that it swings freely responsive to the deflection of the flexible rotary magnetic recording medium, the first elastic modulus of said first gimbal supporting means ranging from 200 g.cm/rad to 500 g.cm/rad and the second elastic modulus of said first gimbal supporting means ranging from 2000 g/cm to 5000 g/cm.

2. A magnetic recording and/or reproducing apparatus as claimed in claim 1 in which said first gimbal support means is made from a beryllium-copper alloy.

3. A magnetic recording and/or reproducing apparatus as claimed in claim 1 in which said first gimbal support means is made from a stainless steel.

* * * * *